United States Patent
Chen et al.

(10) Patent No.: US 12,093,552 B2
(45) Date of Patent: Sep. 17, 2024

(54) DATA MOVEMENT BETWEEN STORAGE TIERS OF A CLUSTERED STORAGE SYSTEM BASED ON PREDICTED DATA ACCESS FREQUENCY TREND PATTERNS

(71) Applicant: Dell Products L.P., Round Rock, TX (US)

(72) Inventors: Chi Chen, Chengdu (CN); Hailan Dong, Chengdu (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/316,907

(22) Filed: May 11, 2021

(65) Prior Publication Data

US 2022/0342578 A1 Oct. 27, 2022

(30) Foreign Application Priority Data

Apr. 14, 2021 (CN) .......................... 202110403293.8

(51) Int. Cl.
*G06F 3/06* (2006.01)
(52) U.S. Cl.
CPC .......... *G06F 3/0647* (2013.01); *G06F 3/0605* (2013.01); *G06F 3/0653* (2013.01); *G06F 3/0659* (2013.01); *G06F 3/067* (2013.01)
(58) Field of Classification Search
CPC .... G06F 3/0647; G06F 3/0605; G06F 3/0653; G06F 3/0659; G06F 3/067
USPC ...................................................... 711/154
See application file for complete search history.

(56) References Cited

U.S. PATENT DOCUMENTS

| | | | | |
|---|---|---|---|---|
| 10,353,616 | B1* | 7/2019 | Tao | G06F 3/061 |
| 2012/0278569 | A1* | 11/2012 | Kawakami | G06F 3/0653 |
| | | | | 711/E12.103 |
| 2014/0380303 | A1* | 12/2014 | Bello | G06F 9/45558 |
| | | | | 718/1 |
| 2020/0036787 | A1* | 1/2020 | Gupta | G06F 3/0685 |
| 2020/0133532 | A1* | 4/2020 | Danilov | G06F 3/0608 |
| 2020/0218464 | A1* | 7/2020 | Patil | G06F 3/0605 |

(Continued)

OTHER PUBLICATIONS

NVM Express, "NVM Express, Revision 1.3," NVM Express, May 1, 2017, 282 pages.

(Continued)

*Primary Examiner* — Gautam Sain
(74) *Attorney, Agent, or Firm* — Ryan, Mason & Lewis, LLP

(57) ABSTRACT

An apparatus comprises a processing device configured to generate a predicted data access frequency trend pattern of a storage object for a designated period of time, the storage object being stored in a first storage tier in a clustered storage system. The processing device is also configured to classify the storage object based on the predicted data access frequency trend pattern, and to determine a given storage tier in the clustered storage system to utilize for storage of the storage object during the designated period of time based on the predicted data access frequency trend pattern. The processing device is also configured, responsive to the given storage tier being different than the first storage tier, to select a type of data movement based on the classification of the storage object and to utilize the selected type of data movement to move the storage object to the given storage tier.

20 Claims, 12 Drawing Sheets

(56) References Cited

U.S. PATENT DOCUMENTS

| | | | |
|---|---|---|---|
| 2020/0326871 A1* | 10/2020 | Wu | G06F 3/0647 |
| 2021/0117121 A1* | 4/2021 | Chen | G06F 3/0649 |
| 2022/0171560 A1* | 6/2022 | Szczepanik | G06F 3/064 |

OTHER PUBLICATIONS

Dell EMC, "Dell EMC VMAX3 Family," Data Sheet, Nov. 2016, 8 pages.

Dell Technologies, "Dell EMC VMAX All Flash: Family Overview," Technical White Paper, Sep. 2020, 40 pages.

Dell Technologies, "Dell EMC Unity: Unisphere Overview," Technical White Paper, Feb. 2020, 41 pages.

EMC2, "Fast.X with EMC CloudArray," White Paper, Sep. 2015, 11 pages.

Dell EMC "Dell EMC VMAX All Flash and VMAX3: Reliability, Availability, and Serviceability," Technical White Paper, Dec. 2020, 57 pages.

\* cited by examiner

| AVAILABLE CAPACITY | ARRAY 1 | ARRAY 2 | ARRAY 3 | ... | ARRAY N | CLUSTER |
|---|---|---|---|---|---|---|
| EXTREME PERFORMANCE TIER | $S_{a1-ssd}$ | $S_{a2-ssd}$ | $S_{a3-ssd}$ | ... | $S_{aN-ssd}$ | $S_{c-ssd}$ |
| PERFORMANCE TIER | $S_{a1-sas}$ | $S_{a2-sas}$ | $S_{a3-sas}$ | ... | $S_{aN-sas}$ | $S_{c-sas}$ |
| CAPACITY TIER | $S_{a1-nlss}$ | $S_{a2-nlss}$ | $S_{a3-nlss}$ | ... | $S_{aN-nlss}$ | $S_{c-nlss}$ |

FIG. 7

DATA MOVEMENT BETWEEN STORAGE TIERS OF A CLUSTERED STORAGE SYSTEM BASED ON PREDICTED DATA ACCESS FREQUENCY TREND PATTERNS

RELATED APPLICATION

The present application claims priority to Chinese Patent Application No. 202110403293.8, filed on Apr. 14, 2021 and entitled "Data Movement Between Storage Tiers of a Clustered Storage System based on Predicted Data Access Frequency Trend Patterns," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for data movement between storage tiers of a clustered storage system based on predicted data access frequency trend patterns.

In one embodiment, an apparatus comprises at least one processing device comprising a processor coupled to a memory. The at least one processing device is configured to perform the step of generating a predicted data access frequency trend pattern of a given storage object for a designated period of time, the given storage object being stored utilizing a first type of storage resources in a given one of two or more storage systems in a clustered storage system, the first type of storage resources being associated with a first one of two or more storage tiers in the clustered storage system. The at least one processing device is also configured to perform the steps of classifying the given storage object as a given one of two or more storage object classes based at least in part on the predicted data access frequency trend pattern of the given storage object for the designated period of time and determining, based at least in part on the predicted data access frequency trend pattern of the given storage object for the designated period of time, a given one of the two or more storage tiers in the clustered storage system to utilize for storage of the given storage object during the designated period of time. The at least one processing device is further configured to perform the step of, responsive to the given storage tier being different than the first storage tier, selecting a type of data movement to utilize for moving the given storage object to a second type of storage resources of one or more of the storage systems in the clustered storage system, the second type of storage resources being associated with the given storage tier in the clustered storage system, the selected type of data movement being based at least in part on the given storage object class associated with the given storage object. The at least one processing device is further configured to perform the step of utilizing the selected type of data movement to move the given storage object to the second type of storage resources of said one or more of the storage systems in the clustered storage system.

These and other illustrative embodiments include, without limitation, methods, apparatus, networks, systems and processor-readable storage media.

BRIEF DESCRIPTION OF THE DRAWINGS

FIG. 7 shows a table of availability capacity for different storage arrays on different tiers of a multi-tier clustered storage system.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
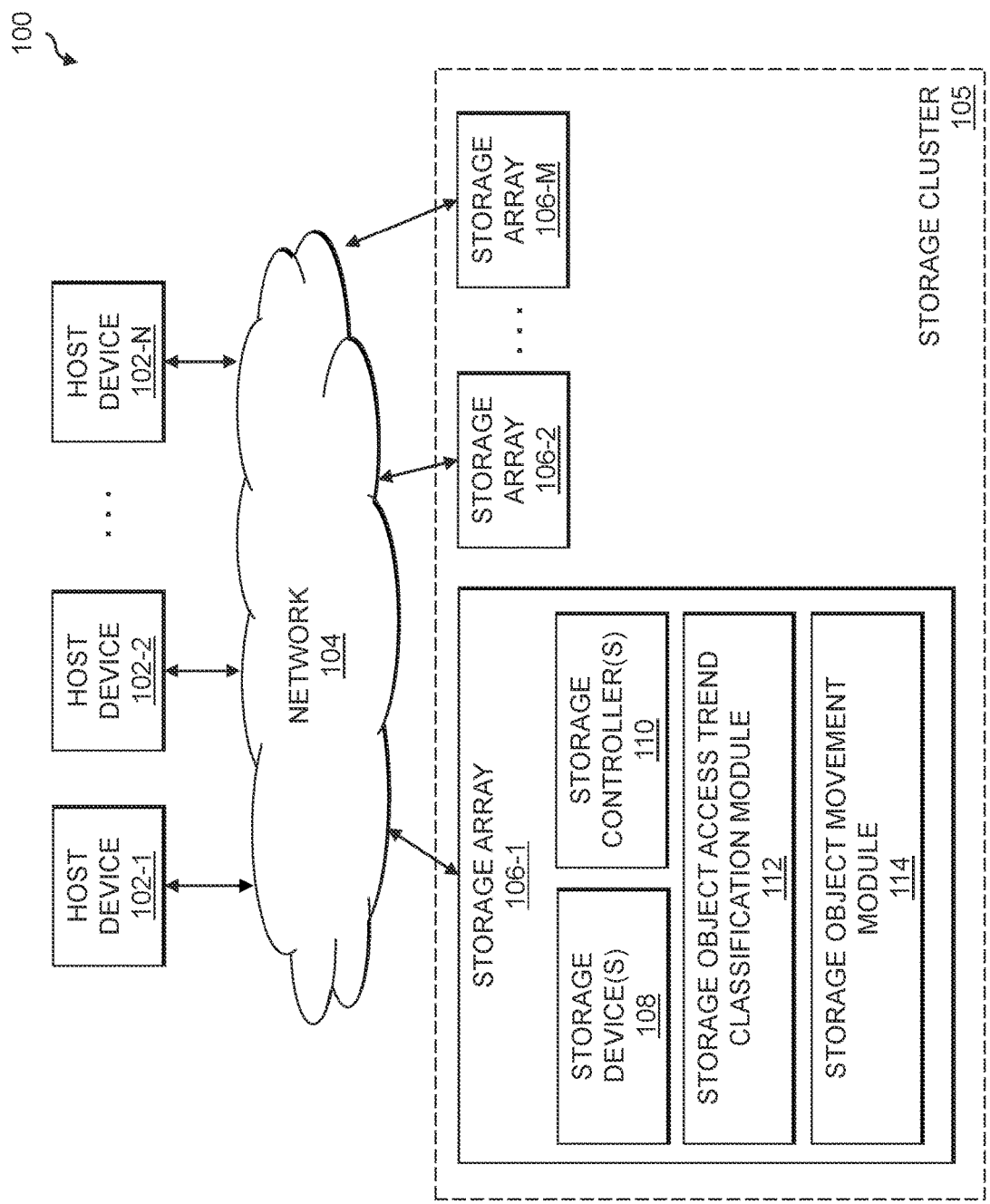
FIG. 1 is a block diagram of an information processing system for data movement between storage tiers of a clustered storage system based on predicted data access frequency trend patterns in an illustrative embodiment.

FIG. 1 shows an information processing system 100 configured in accordance with an illustrative embodiment to provide functionality for data movement between storage tiers of a clustered storage system based on predicted data access frequency trend patterns. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster 105. At least one of the storage controllers of the storage arrays 106 (e.g., the storage controller 110 of storage array 106-1) is assumed to implement functionality for intelligent data movement across the storage devices 108 of the storage array 106-1 (e.g., between different ones of the storage devices 108 or portions thereof that provide different storage tiers in the storage cluster 105), and between the storage array 106-1 and one or more other ones of the storage arrays 106-2 through 106-M. Such intelligent data movement functionality is provided via a storage object access trend classification module 112 and a storage object movement module 114.

As noted above, the storage arrays 106 in the FIG. 1 embodiment are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The storage object access trend classification module 112 is configured to classify storage objects (e.g., one or more files, directories, filesystems, LUNs, etc.) that are stored on the storage devices of the storage array 106-1. In some embodiments, storage objects are classified as belonging to one of two classes. A first class of storage objects includes storage objects with IO temperature trends, during a defined time period, that are predicted to be above a high water mark threshold or below a low water mark threshold (e.g., the IO temperature of storage objects in the first class are predicted to be "hot" or "cold" during the defined time period). A second class of storage objects includes storage objects with IO temperature trends, during the defined time period, that are predicted to be between the high water mark threshold and the low water mark threshold (e.g., the IO temperatures of storage objects in the second class are not predicted to be "hot" or "cold" during the defined time period).

The storage object movement module 114 is configured to determine the type of data movement to be utilized for storage objects based at least in part on the classifications provided by the storage object access trend classification module 112. For example, storage objects in the first class may be considered suitable for movement or migration both within the storage array 106-1, and between the storage array 106-1 and one or more other ones of the storage arrays 106-2 through 106-M (e.g., since they have relatively stable "hot" or "cold" predicted access trends over the defined time period, and thus are not likely to need to be moved frequently during the defined time period). In other words, storage objects in the first class may be moved via intra-storage array internal data movement functionality, or using cluster-level or inter-storage array data movement functionality.

Storage objects in the second class may not be considered suitable for movement or migration between the storage array 106-1 and one or more other ones of the storage arrays 106-2 through 106-M (e.g., since they do not have relatively stable "hot" or "cold" predicted access trends over the defined time period, and thus may be likely to need to be moved frequently during the defined time period). Storage objects in the second class, however, may be considered suitable for movement or migration within the storage array 106-1 (e.g., using intra-storage array internal data movement functionality) which is less costly (e.g., less resource-intensive) than cluster-level or inter-storage array data movement functionality.

The storage object movement module 114 will then move storage objects utilizing the type of data movement associated with their associated classes, when such movement is appropriate. Consider, for example, a given storage object that is currently stored on one of the storage devices 108 of storage array 106-1 that provides storage for a first storage tier, but whose predicted data access frequency over the defined time period corresponds to or warrants storage in a second storage tier different than the first storage tier (e.g., the given storage object may be currently stored in a portion of a storage device that provides storage for a capacity tier, but its predicted data access frequency over the defined time period is sufficiently high that it warrants being stored in a performance tier). In this instance, it is desirable to move the given storage object to storage associated with the second storage tier.

As noted above, intra-storage array internal data movement functionality is generally less costly or resource-intensive than cluster-level or inter-storage array data movement functionality. Thus, the storage object movement module 114 may determine whether the storage array 106-1 has available capacity in one or more of the storage devices 108 providing storage for the second storage tier. If so, the storage object movement module 114 may move the storage object using intra-storage array internal data movement functionality. If the storage array 106-1 does not have available capacity in one or more of the storage devices 108 providing storage for the second tier, then the class of the given storage object is identified to determine whether the given storage object's predicted data access trends for the defined time period warrants use of cluster-level or inter-storage array data movement functionality. Thus, if the given storage object has the first class, it may be moved to a storage device on another one of the storage arrays 106-2 through 106-M that has available storage in the second storage tier. If the given storage object has the second class, it will not be moved using cluster-level or inter-storage array data movement functionality.

There may be multiple storage objects whose predicted data access trends for the defined time period do not match their current storage tier. In such instances, the multiple storage objects may be "ranked" based on the difference between their predicted access trends and their current storage location. Consider, as an example, a multi-tier storage system with three storage tiers (capacity, performance and extreme performance). If there are two storage objects in the storage array 106-1 that are currently stored in the capacity tier but have predicted data access trends that warrant storage in the extreme performance tier, both of the storage objects would benefit from being moved. However, if there is insufficient available capacity to move both of the storage objects to the extreme performance tier, then the storage object with the higher predicted data access trend may be moved to the extreme performance tier and the storage object with the lower predicted data access trend may be kept in place (or possibly moved to the performance tier, if the performance tier has available capacity).

The above-described ranking of storage objects may also consider the classifications of the two storage objects. Consider, as an example, that a first one of the two storage objects has the first class (and is thus suitable or either intra-storage array internal data movement or inter-storage array data movement) while the second one of the two storage objects has the second class (and is thus suitable for intra-storage array internal data movement but not inter-storage array data movement). Assume that the first and second storage objects are both currently on the storage array 106-1, that the second storage object has lower predicted data access trends than the first storage object, that the storage array 106-1 has insufficient available capacity to move both the first and second storage objects to storage in storage devices 108 in the extreme performance tier, and that there is sufficient available capacity in one or more other ones of the storage arrays 106-2 through 106-M in the extreme performance tier. Given the above, movement of both the first and second storage objects can be accommodated by moving the first storage object having the first class using inter-storage array data movement functionality to one or more other ones of the storage arrays 106-2 through 106-M and moving the second storage object having the second class using intra-storage array data movement functionality within the storage array 106-1.

Although in the FIG. 1 embodiment the storage object access trend classification module 112 and the storage object movement module 114 are shown as being implemented internal to the storage array 106-1 and outside the storage controllers 110, in other embodiments one or both of the storage object access trend classification module 112 and the storage object movement module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the storage object access trend classification module 112 and the storage object movement module 114.

At least portions of the functionality of the storage object access trend classification module 112 and the storage object movement module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane® devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for data movement between storage tiers of a clustered storage system based on predicted data access frequency trend patterns is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for data movement between storage tiers of a clustered storage system based on predicted data access frequency trend patterns will now be described in more detail with reference to the flow diagram of FIG. 2. It is to be understood that this particular process is only an example, and that additional or alternative processes for data movement between storage tiers of a clustered storage system based on predicted data access frequency trend patterns may be used in other embodiments.

In this embodiment, the process includes steps 200 through 208. These steps are assumed to be performed by the storage object access trend classification module 112 and the storage object movement module 114. The process begins with step 200, generating a predicted data access frequency trend pattern of a given storage object for a designated period of time. The given storage object is stored utilizing a first type of storage resources in a given one of two or more storage systems in a clustered storage system. The first type of storage resources is associated with a first one of two or more storage tiers in the clustered storage system.

Step 200 may comprise generating a prediction function for predicting a total amount of data accesses for the given storage object in the designated period of time. The predicted data access frequency trend pattern may comprise one of an increasing data access trend pattern and a decreasing data access trend pattern, and the prediction function may be generated utilizing a least squares algorithm. The predicted data access frequency trend pattern may comprise a cyclic data access trend pattern, and the prediction function may be generated utilizing at least one of an autocorrelation algorithm and a discrete Fourier transform algorithm. The predicted data access frequency trend pattern may comprise an irregular data access pattern, and the prediction function may be generated utilizing an average of historical data accesses for the given storage object over a previous period of time.

In step 202, the given storage object is classified as a given one of two or more storage object classes based at least in part on the predicted data access frequency trend pattern of the given storage object for the designated period of time. The two or more storage object classes may comprise: a first storage object class comprising storage objects with predicted data access frequency trend patterns for the designated period of time that are above a first data access frequency threshold or below a second data access frequency threshold; and a second storage object class comprising storage objects with predicted data access frequency trend patterns for the designated period of time that are between the first data access frequency threshold and the second data access frequency threshold. In some embodiments, storage objects classified in the first storage object class are permitted to utilize (i) intra-storage system data movement within a single one of the two or more storage systems in the clustered storage system and (ii) inter-storage system data movement between two or more different ones of the two or more storage systems in the clustered storage system, while storage objects classified in the second storage object class are permitted to utilize (i) intra-storage system data movement within a single one of the two or more storage systems in the clustered storage system but not (ii) inter-storage system data movement between two or more different ones of the two or more storage systems in the clustered storage system.

Figure 2:
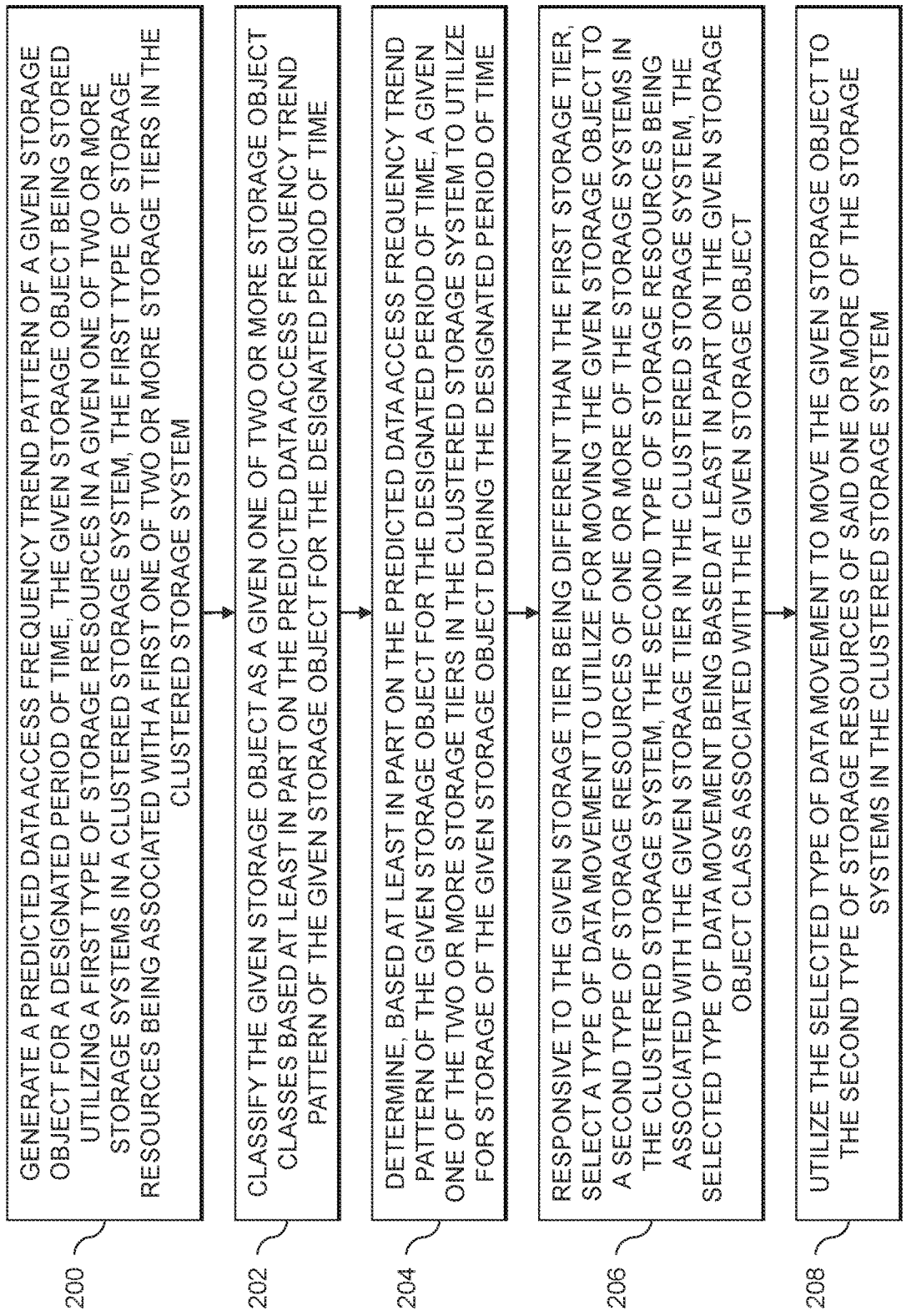
FIG. 2 is a flow diagram of an exemplary process for data movement between storage tiers of a clustered storage system based on predicted data access frequency trend patterns in an illustrative embodiment.

The FIG. 2 process continues with step 204, determining, based at least in part on the predicted data access frequency trend pattern of the given storage object for the designated period of time, a given one of the two or more storage tiers in the clustered storage system to utilize for storage of the given storage object during the designated period of time. Responsive to the given storage tier being different than the first storage tier, a type of data movement to utilize for moving the given storage object to a second type of storage resources of one or more of the storage systems in the clustered storage system is selected in step 206. The second type of storage resources is associated with the given storage tier in the clustered storage system. The selected type of data movement is based at least in part on the given storage object class associated with the given storage object. In step 208, the selected type of data movement is utilized to move the given storage object to the second type of storage resources of said one or more of the storage systems in the clustered storage system. Said one or more of the storage systems may comprise the given storage system (e.g., the given storage object is moved using intra-storage system data movement between different storage devices providing storage for the first and given storage tier) or may be at least one of the two or more storage systems different than the given storage system (e.g., the given storage object is moved using inter-storage system data movement).

Step 208 may include determining a ranking of the two or more storage systems in the clustered storage system for the given storage tier based at least in part on available storage capacity and load handling ability of each of the two or more storage systems for the given storage tier, and said one or more of the storage systems in the clustered storage system may be selected based at least in part on the determined ranking of the two or more storage systems.

In some embodiments, step 208 includes determining whether the given storage system has an available amount of the second type of storage resources sufficient to store the given storage object and, responsive to determining that the given storage system has the available amount of the second type of storage resources sufficient to store the given storage object, moving the given storage object to the second type of storage resources in the given storage system. Step 208 may include determining whether the given storage system has an available amount of the second type of storage resources sufficient to store the given storage object and, responsive to determining that the given storage system does not have the available amount of the second type of storage resources sufficient to store the given storage object, determining whether the given storage object class associated with the given storage object permits data movement between different ones of the two or more storage systems in the clustered storage system. Responsive to determining that the given storage object class associated with the given storage object permits data movement between different ones of the two or more storage systems in the clustered storage system, identifying one or more other ones of the two or more storage systems having an available amount of the second type of storage resources sufficient to store the given storage object and moving the given storage object to the second type of storage resources in one of the identified storage systems.

In a data center or other type of IT infrastructure including cloud computing platforms, there may be many different storage arrays each with their own characteristics and advantages for different types of workloads. For example, a data center associated with a business or other enterprise may offer comprehensive services to customers or other users with high quality through leveraging the different characteristics of such storage arrays, including different characteristics of storage devices within each of the storage arrays. In some cases, storage arrays are part of a clustered storage system (also referred to herein as a storage cluster, a storage array cluster or an array cluster).

At the array cluster level, as business needs change, the "hot degree" of different data may be changing continuously. The hot degree or IO temperature may characterize data access frequency (e.g., a number of IO requests within a designated threshold of a current time), or other types of IO metrics. Because of such changes in hot degree, data that currently resides on a high performance storage array may become cold while data which resides on a low performance storage array may become hot. To optimize performance, there is thus a need for self-service data movement between different arrays in an array cluster (e.g., according to data access frequency). Such self-service data movement may include breaking the barrier among storage arrays in the array cluster, moving hot data to high performance storage arrays, archiving cold data to lower performance storage arrays, etc. This advantageously provides various benefits to the customers or other end-users (e.g., increasing performance, reducing cost, improving storage utilization efficiency and speeding up customer business processing in the array cluster, etc.).

For some storage arrays and array clusters, data movement functionality may be used to extend storage tiering among different storage arrays or platforms and cloud storage platforms, to move data among heterogeneous storage resources, to fully utilize storage resources at the storage cluster level and possibly across data centers. In some storage arrays, such data movement functionality may include FAST technology, also referred to as FAST Sideways or FAST.X. For example, a Dell EMC VMAX storage array may implement FAST hinting, which provides users with a way to accelerate mission critical processes based on business priority and other service level objectives (SLOs). FAST hinting is advantageously application aware, and leverages storage and performance analyzers to monitor the read and write status of different workloads to send hints to storage arrays for data that is likely to be accessed in a given period of time. An IT administrator may create FAST hint profiles, which are given a priority and scheduled one-off, ongoing, or on a recurring frequency (e.g., daily, weekly, monthly, etc.) along with an expected execution duration. Such hints may be provided via an analytics tab of analytics software of a storage array (e.g., a database storage analyzer interface in Unisphere for a VMAX array).

Based on provided hints, a performance analyzer can watch for increased workload demands before taking action. For example, FAST can receive hints from a database storage analyzer through a hint manager application programming interface (API) and proactively adjust the storage device mix according to a priority set (e.g., a mix of flash and serial attached SCSI (SAS) storage devices). The storage device mix may be automatically adjusted, and is subject to keeping SLOs intact and does not override previous SLOs. FAST or other data movement functionality provides capabilities for delivering leading edge application-aware functionality for customers or end-users that require the best response times for mission-critical applications in specific business periods.

In addition to optimization through FAST hinting, data services may also extend beyond a storage array itself and across the data center through FAST.X. FAST.X advantageously evolves and extends storage tiering and service-level management to other storage platforms as well as cloud storage. FAST.X enables data movement across storage technologies provided by various block devices (e.g., including Dell EMC XtremIO, VNX, CloudArray and other types of storage). FAST.X simplifies management and operations, and consolidates heterogeneous storage under its control. FAST.X further extends SLO management to external storage arrays as well. Enabling SLO management across external storage arrays enables easy integration for different appliances as needed by different workloads and requirements. FAST.X may simplify management at scale, providing workload optimization across storage arrays with the same simplicity as internal SLO provisioning. The advanced automation of FAST optimizes customer or other end-user workloads to automatically apply the necessary amounts of resources, and FAST.X extends this capability to external storage arrays according to the same specified performance and availability criteria. As noted above, FAST.X may also be integrated with cloud storage, such as to move less active workloads to more cost-efficient cloud storage.

Data movement across multiple storage arrays in an array cluster (e.g., using FAST/FAST.X functionality described above) is a resource intensive task. In addition to computing resources on the different storage arrays where data is being moved, such data movement may also lead to additional network load thus reducing overall performance of the array cluster. Inter-array data movement may be at a high level of granularity (e.g., moving storage objects such as LUNs or filesystems) with large size (e.g., one to several gigabytes (GBs) or more). Thus, data movement across storage arrays is heavier or more resource intensive than internal storage array data movement (e.g., between different storage devices of a single storage array). Thus, it is desirable to reduce inter-array data movement for an array cluster.

Illustrative embodiments provide techniques for analyzing data activity with a long-term view, and evaluating total data activity trends in future time periods to more intelligently move data across storage arrays of an array cluster. Some embodiments utilize techniques that leverage time series data theory, and based on historical IO access frequency, will predict future load trends for storage arrays in an array cluster. Storage objects may be classified according to their respective IO trends. In some embodiments, storage objects are classified into one of two classes: (1) a first class for storage objects with long-term IO temperature trends that are cold or hot; and (2) a second class for storage objects with long-term IO temperature trends that are neither cold nor hot. Storage objects in the first class are suitable for migration within a storage array or between storage arrays, as such storage objects do not need to be moved frequently (e.g., such objects may be selected for cluster-level FAST operations). Storage objects in the second class are not suitable for migration between storage arrays, and instead may be migrated internally within a storage array (e.g., internal storage array FAST). In this way, illustrative embodiments can reduce unnecessary frequent data relocation, improving cluster level data movement efficiency.

In storage systems, most customer or end-user storage objects exhibit data access frequency which shows patterns with time series. The data access frequency patterns may be specific to specific business areas or divisions. Non-stationary time series data is a focus, as this may exhibit valuable forecasting. There may be various patterns for non-stationary time series data, including various trend patterns, cyclic patterns, irregular patterns, etc. Data IO frequency information may be obtained from each storage array in an array cluster.

Figure 3:
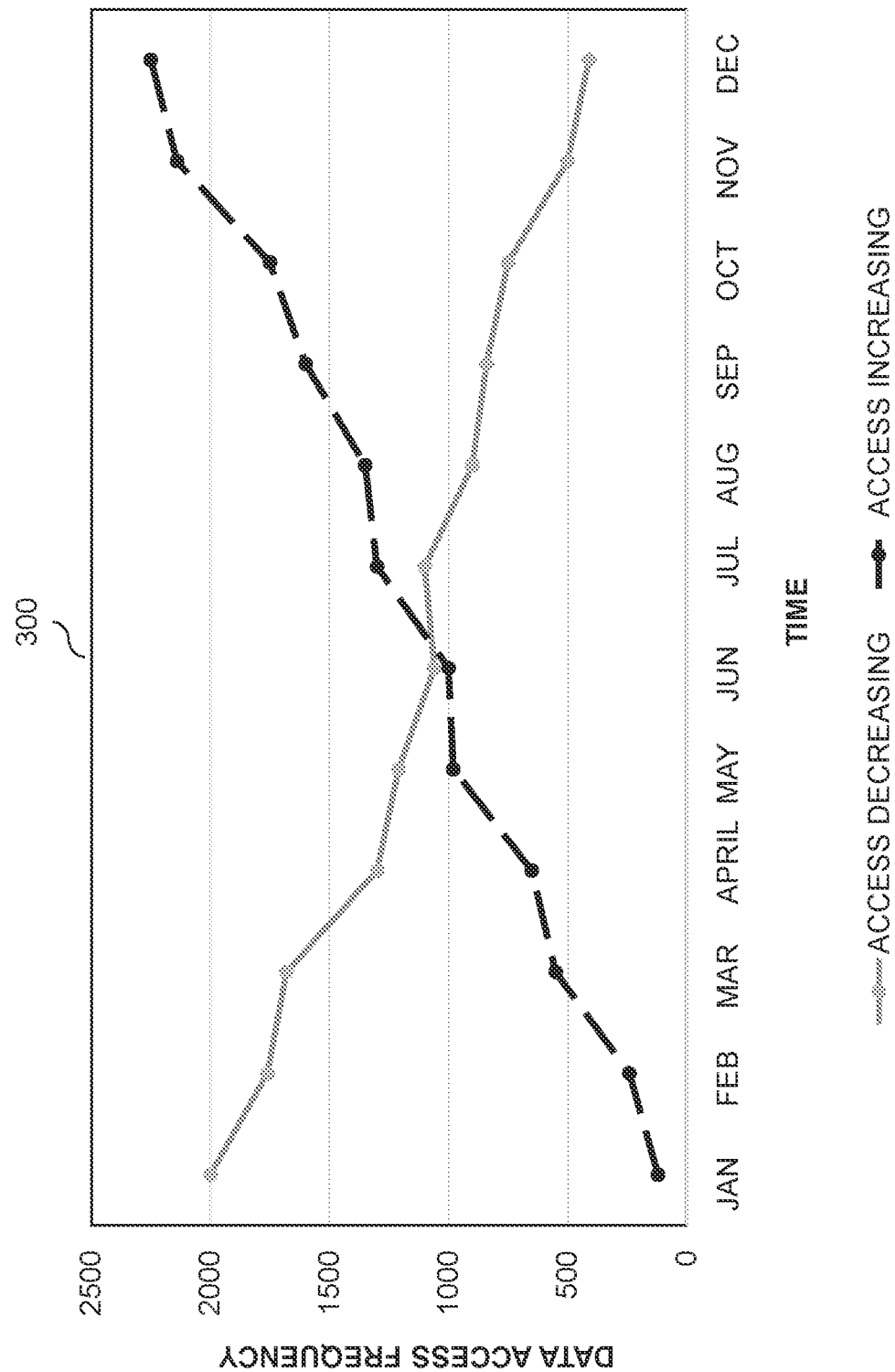
FIG. 3 shows a plot of storage access data pattern trends in an illustrative embodiment.

Trend patterns refer to IO access frequency that is increasing or decreasing. For example, various data may have most of its activity close in time to its creation and as the data ages the activity becomes colder and access frequency decreases. Other data may have infrequent activity close in time to its creation and as the data ages the activity becomes hotter and access frequency increases. FIG. 3 illustrates a plot 300, which shows examples of trend patterns for increasing data access frequency and decreasing data access frequency. Although the plot 300 illustrates trend patterns that are linear, trend patterns may also be non-linear (e.g., exponential). In some embodiments, a least squares method is leveraged based on a data access sample set to generate a prediction function $f(t)=a_0+a_1t+a_2t^2+ \ldots +a_m t^m$. The prediction function may be used to predict the total data access numbers in a future period T using Equation (1):

$$H = sumPredfunc(T) = \sum_{t=T_0}^{t=T_0+T}$$

$$f(t) = \sum_{t=T_0}^{t=T_0+T} a_0 + a_1 t + a_2 t^2 + \ldots + a_m t^m$$

Figure 4:
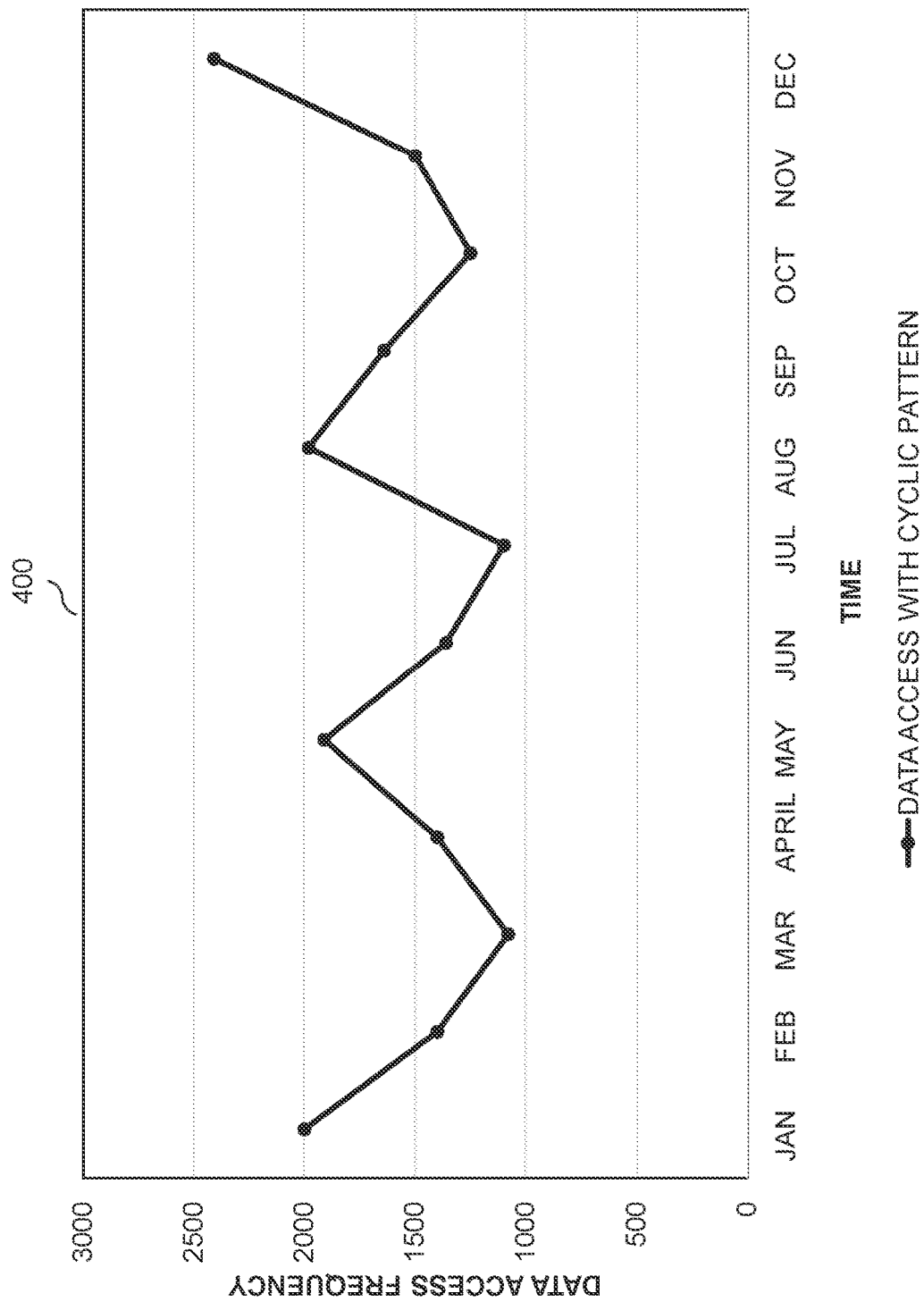
FIG. 4 shows a plot of a cyclic storage access data pattern trend in an illustrative embodiment.

A cyclic pattern refers to a data access pattern where data access frequency rises and falls with some regularity (e.g., hourly, daily, monthly, seasonally, yearly, etc.). For example, some data may be frequently accessed during holiday or festival periods, as illustrated in the plot 400 of FIG. 4. To determine if the data is cyclic, some embodiments leverage an autocorrelation function or a discrete Fourier transform method to detect the periodicity based on data access sampling. Spectrum analysis can then be used to get the period or frequency of cyclic or seasonal time series data, to obtain a Fourier series prediction function $$f(t) = a_0 + \sum_{n=1}^{\infty} \left( a_n \cos \frac{n\pi t}{L} + b_n \sin \frac{n\pi t}{L} \right).$$

This may be used to predict the total data access numbers in a future period T using Equation (2):

$$H = sumPredfunc(T) = \sum_{t=now}^{t=now+T}$$

$$f(t) = \sum_{t=T_0}^{t=T_0+T} a_0 + \sum_{n=1}^{\infty} \left( a_n \cos \frac{n\pi t}{L} + b_n \sin \frac{n\pi t}{L} \right)$$

Figure 5:
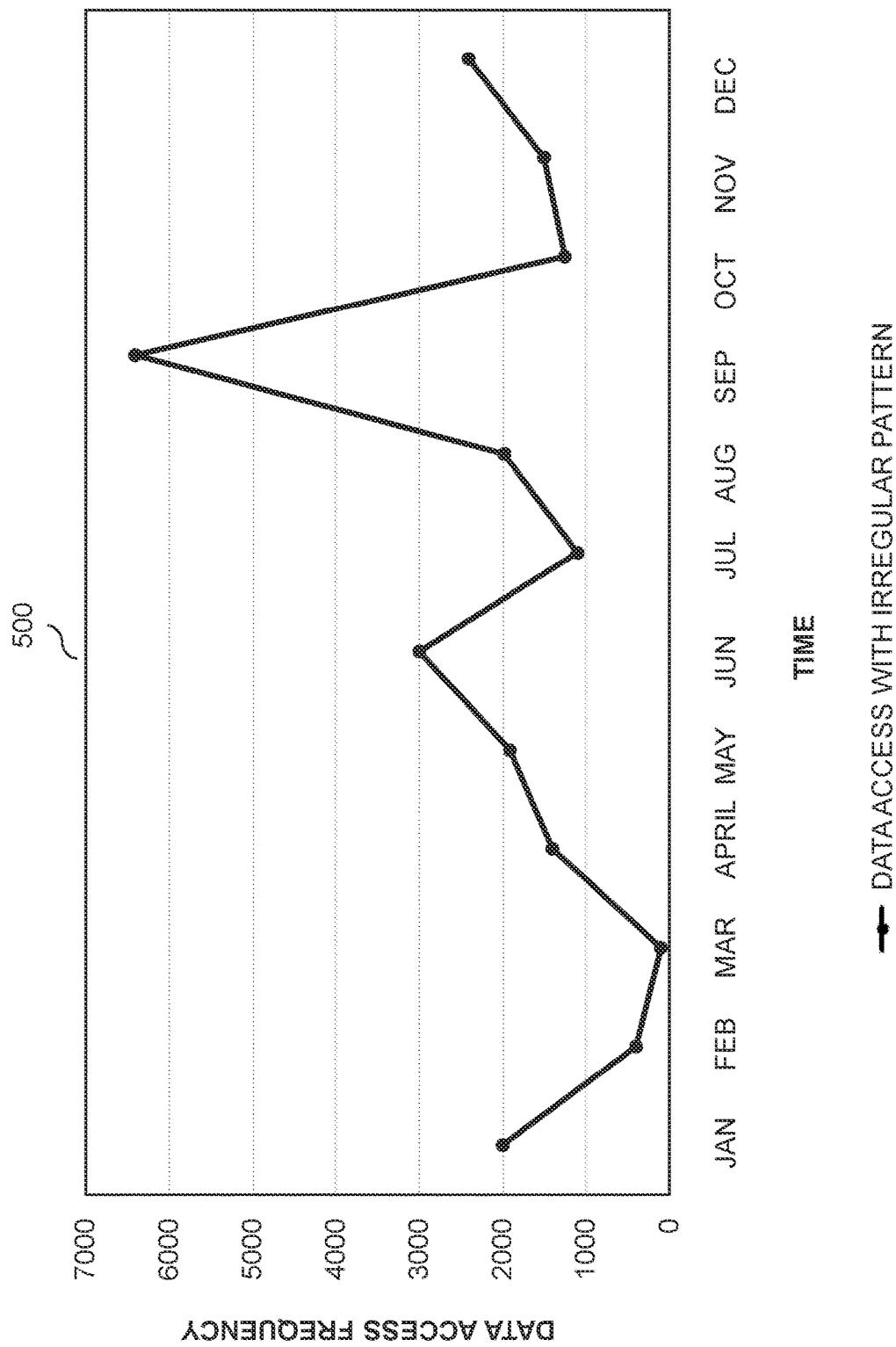
FIG. 5 shows a plot of an irregular storage access data pattern trend in an illustrative embodiment.

An irregular data pattern refers to a data access pattern where the data access frequency changes randomly, and usually refers to data that does not have a trend function or periodicity. FIG. 5 shows a plot 500 illustrating an irregular data access pattern. For irregular data access patterns, the historical data access samples may be averaged $$f(t) = \frac{\sum_{i=1}^{i=K} D_i}{K}.$$

This may then be used to predict the total data access numbers in a future period T using Equation (3):

$$H = sumPredfunc(T) = \sum_{t=T_0}^{t=T_0+T}$$

$$f(t) = \sum_{t=T_0}^{t=T_0+T} \frac{\sum_{i=1}^{i=K} D_i}{K}$$

An implementation of an algorithm for enhancing the efficiency of data movement in an array cluster will now be described with respect to an array cluster that includes N storage arrays, where the array cluster classifies storage resources as belonging to one of three storage tiers: Tier 1, also referred to as an "extreme performance" tier (e.g., including SAS flash, SSD, NVMe drives); Tier 2, also referred to as a "performance" tier (e.g., including SAS drives); and Tier 3, also referred to as a "capacity" tier (e.g., including near line SAS (NL-SAS) drives or low-cost cloud storage).

The following notation will be utilized for describing the algorithm for enhancing the efficiency of inter-array data movement in the array cluster:

$S_{ai\text{-}ssd}$: the available SAS flash or SSD capacity of storage array i;

$S_{c\text{-}ssd} = \Sigma_{i=1}^N S_{ai\text{-}ssd}$: the total available SAS flash or SSD capacity of the array cluster, representing the sum of the individual storage arrays SAS flash or SSD capacity;

$S_{ai\text{-}sas}$: the available SAS capacity of storage array i;

$S_{c\text{-}sas} = \Sigma_{i=1}^N S_{ai\text{-}sas}$: the total available SAS capacity of the array cluster, representing the sum of the individual storage arrays' SAS capacity;

$S_{ai\text{-}nlsas}$: the available NL-SAS capacity of storage array i;

$S_{c\text{-}nlsas} = \Sigma_{i=1}^N S_{ai\text{-}nlsas}$: the total available NL-SAS capacity of the array cluster, representing the sum of the individual storage arrays' NL-SAS capacity;

$$R_{ai\text{-}ssd} = \frac{S_{ai\text{-}ssd}}{S_{c\text{-}ssd}} = \frac{S_{ai\text{-}ssd}}{\sum_{k=1}^N S_{ai\text{-}ssd}};$$

the ratio of storage array i's available flash capacity in the array cluster, where the greater the value of $R_{ai\text{-}ssd}$ the more the available flash capacity of storage array i in the array cluster's extreme performance tier;

$$R_{ai\text{-}sas} = \frac{S_{ai\text{-}sas}}{S_{c\text{-}sas}} = \frac{S_{ai\text{-}sas}}{\sum_{k=1}^N S_{ai\text{-}sas}};$$

the ratio of storage array i's available SAS capacity in the array cluster, where the greater the value of $R_{ai\text{-}sas}$ the more the available SAS capacity of storage array i in the array cluster's performance tier;

$$R_{ai\text{-}nlsas} = \frac{S_{ai\text{-}nlsas}}{S_{c\text{-}nlsas}} = \frac{S_{ai\text{-}nlsas}}{\sum_{k=1}^N S_{ai\text{-}nlsas}};$$

the ratio of storage array i's available NL-SAS capacity in the array cluster, where the greater the value of $R_{ai\text{-}nlsas}$ the more the available NL-SAS capacity of storage array i in the array cluster's capacity tier;

$U_{ai\text{-}ssd}$: the used flash capacity of storage array i;
$U_{ai\text{-}sas}$: the used SAS capacity of storage array i;
$U_{ai\text{-}nlsas}$: the used NL-SAS capacity of storage array i;
$L_{ai\text{-}ssd}$: the historic cumulative IO requests to flash capacity for storage array i;
$L_{ai\text{-}sas}$: the historic cumulative IO requests to SAS capacity for storage array i;
$L_{ai\text{-}nlsas}$: the historic cumulative IO requests to NL-SAS capacity for storage array i;

$$W_{ai\text{-}ssd} = \frac{L_{ai\text{-}ssd}}{U_{ai\text{-}ssd}};$$

the average IO requests per unit of flash storage space of the storage array i;

$$W_{ai\text{-}sas} = \frac{L_{ai\text{-}sas}}{U_{ai\text{-}sas}};$$

the average IO requests per unit of SAS storage space of the storage array i;

$$W_{ai\text{-}nlsas} = \frac{L_{ai\text{-}nlsas}}{U_{ai\text{-}nlsas}};$$

the average IO requests per unit of NL-SAS storage space of the storage $$F_{ai\text{-}ssd} = \frac{\frac{1}{W_{ai\text{-}ssd}}}{\sum_{k=1}^N \frac{1}{W_{ai\text{-}ssd}}} = \frac{\frac{U_{ai\text{-}ssd}}{L_{ai\text{-}ssd}}}{\sum_{k=1}^N \frac{U_{ai\text{-}ssd}}{L_{ai\text{-}ssd}}};$$

the inverse proportion of normalized average IO load for storage array i in the extreme performance tier, where if the cumulative historical IO for the storage array i for the extreme performance tier has a small value this means that the storage array i load is small for the extreme performance tier and, per load balancing review, the storage array i should or can handle more IO for the extreme performance tier in the future;

$$F_{ai\text{-}sas} = \frac{\frac{1}{W_{ai\text{-}sas}}}{\sum_{k=1}^N \frac{1}{W_{ai\text{-}sas}}} = \frac{\frac{U_{ai\text{-}sas}}{L_{ai\text{-}sas}}}{\sum_{k=1}^N \frac{U_{ai\text{-}sas}}{L_{ai\text{-}sas}}};$$

the inverse proportion of normalized average IO load for storage array i in the performance tier, where if the cumulative historical IO for the storage array i for the performance tier has a small value this means that the storage array i load is small for the performance tier and, per load balancing review, the storage array i should or can handle more IO for the performance tier in the future;

$$F_{ai\text{-}nlsas} = \frac{\frac{1}{W_{ai\text{-}nlsas}}}{\sum_{k=1}^N \frac{1}{W_{ai\text{-}nlsas}}} = \frac{\frac{U_{ai\text{-}nlsas}}{L_{ai\text{-}nlsas}}}{\sum_{k=1}^N \frac{U_{ai\text{-}nlsas}}{L_{ai\text{-}nlsas}}};$$

the inverse proportion of normalized average IO load for storage array i in the capacity tier, where if the cumulative historical IO for the storage array i for the capacity tier has a small value this means that the storage array i load is small for the capacity tier and, per load balancing review, the storage array i should or can handle more IO for the capacity tier in the future;

$C_{ai\text{-}ssd} = \omega_S \cdot R_{ai\text{-}ssd} + \omega_L \cdot F_{ai\text{-}ssd}$: for the extreme performance tier, the comprehensive score for storage array i, which combines the storage array i's storage and load ability, where if the storage array i has high available capacity and low load in the extreme performance tier then the storage array i is a good candidate for handling more IO for the extreme performance tier, the weight of size and load ability summing to 1 (e.g., $\omega_S + \omega_L = 1$);

$C_{ai\text{-}sas} = \omega_S \cdot R_{ai\text{-}sas} + \omega_L \cdot F_{ai\text{-}sas}$: for the performance tier, the comprehensive score for storage array i, which combines the storage array i's storage and load ability, where if the storage array i has high available capacity and low load in the performance tier then the storage array i is a good candidate for handling more IO for the performance tier, the weight of size and load ability summing to 1 (e.g., $\omega_S + \omega_L = 1$);

$C_{ai\text{-}nlsas}=\omega_S \cdot R_{ai\text{-}nlsas}+\omega_L \cdot F_{ai\text{-}nlsas}$: for the performance tier, the comprehensive score for storage array i, which combines the storage array i's storage and load ability, where if the storage array i has high available capacity and low load in the performance tier then the storage array i is a good candidate for handling more IO for the performance tier, the weight of size and load ability summing to 1 (e.g., $\omega_S+\omega_L=1$);

$T_0$: the time point for starting prediction of data access trends; and $H_{ai,j}=\text{sumPredfunc}(T)=\Sigma_{t=T_0}^{T_0+T} f(t)$: according to the sample data, with a time series data pattern model, predict in a future time period T the total IO request number $H_{ai,j}$ of data j on storage array i, denoted $D_{ai,j}$.

The algorithm for enhancing the efficiency of data movement in the array cluster may include four steps of phases: (1) data collection; (2) data hot degree prediction and tier checking; (3) analyzing and ranking storage arrays in the array cluster; and (4) determining a data movement solution that reaches a long-term storage efficiency for the array cluster.

In step or phase (1), necessary data is collected from the array cluster. One or more monitoring services or APIs are used to collect storage array information in the array cluster, where the storage array information may include: drive or storage device types in each storage array; the available capacity of drives or devices in each tier of each storage array in the array cluster (e.g., $S_{ai\text{-}ssd}$, $S_{ai\text{-}sas}$, $S_{ai\text{-}nlsas}$); the used space of the storage arrays in the array cluster for each tier in the array cluster (e.g., $U_{ai\text{-}ssd}$, $U_{ai\text{-}sas}$, $U_{ai\text{-}nlsas}$); the historical IO load for each of the storage arrays in the array cluster for each tier in the array cluster (e.g., $L_{ai\text{-}ssd}$, $L_{ai\text{-}sas}$, $L_{ai\text{-}nlsas}$); sampling the user data access frequency; etc.

In step or phase (2), time series data pattern analysis is performed using the data collected in step or phase (1) to predict the hot degree for data (e.g., storage objects) in the array cluster to check if the data is in the proper tier. The time series data patterns may include the different types of data patterns described above (e.g., increasing or decreasing data patterns, cyclic data patterns, irregular data patterns, etc.). The time series data patterns may be used to predict, for a future time period T (e.g., a next day, week, month, quarter, year, etc.) the data's total IO requests using Equation (4):

$$H_{ai,j} = \text{sumPredfunc}(T) = \sum_{t=T_0}^{t=T_0+T} f(t)$$

This may use the Equations (1)-(3) described above for each kind of data pattern. Consider, for example, a decreasing data access pattern. According to the decreasing trend, curve fitting as a linear function may be utilized (e.g., $f(t)=a_0+a_1 t$) to calculate after a current time point $T_0$ in the future time period T what the total IO access number for the jth data which resides on the storage array i will be, according to:

$$H_{ai,j} = \text{sumPredfunc}(T) = \sum_{t=T_0}^{t=T_0+T} f(t) = \sum_{t=T_0}^{t=T_0+T} a_0 + a_1 t$$

Figure 6:
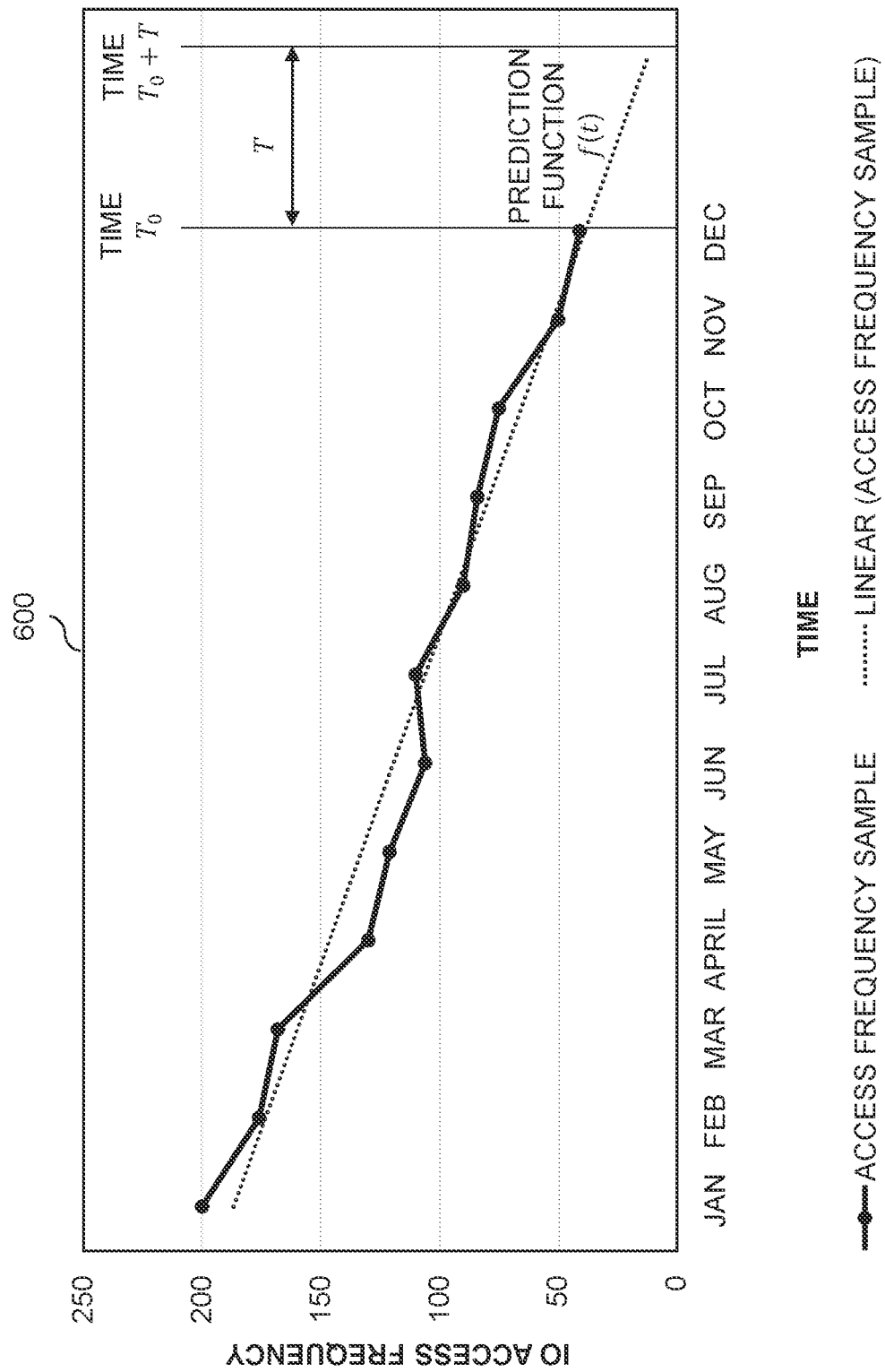
FIG. 6 shows a plot of a decreasing storage access data pattern trend in an illustrative embodiment.

FIG. 6 illustrates a plot 600 showing, for a data access decreasing data pattern trend, the projected IO access frequency using a linear curve fitting function $f(t)$, beginning at time point $T_0$ and continuing for the time period T. For the array cluster, data may be sorted according to the long-term prediction total access frequency $H_{ai,j}$ (e.g., from big to small) and tagged with levels for each of the tiers in array cluster. Continuing with the example array cluster above, there would be tags for three levels (e.g., first, second and third) mapped to the three tiers (e.g., extreme performance, performance, capacity).

In step or phase (3), the storage arrays in the array cluster are analyzed and ranked. FIG. 7 shows a table 700 that indicates the available capacity of each tier of each storage array in the array cluster. It should be noted that, if a particular storage array has no drives or devices providing storage for a particular tier, then the $S_{ai}=0$ for that tier. For example, if storage array 1 has no drives or devices that have performance characteristics suitable for use in the extreme performance tier, then $S_{a1\text{-}ssd}=0$.

For each storage array and each tier type, the available size ratio $$R_{ai} = \frac{S_{ai}}{S_c}$$

in the array cluster can be represented as a 3×N matrix:

$$R = \begin{bmatrix} R_{a1-ssd} & R_{a2-ssd} & R_{a3-ssd} & \cdots & R_{aN-ssd} \\ R_{a1-sas} & R_{a2-sas} & R_{a3-sas} & \cdots & R_{aN-sas} \\ R_{a1-nlsas} & R_{a2-nlsas} & R_{a3-nlsas} & \cdots & R_{aN-nlsas} \end{bmatrix}$$

For each storage array and each tier type, the load handling ability or can handle load ratio $$F_{ai} = \frac{\frac{U_{ai}}{L_{ai}}}{\sum_{k=1}^{N} \frac{U_{ai}}{L_{ai}}}$$

in the cluster can also be represented as a 3×N matrix:

$$F = \begin{bmatrix} F_{a1-ssd} & F_{a2-ssd} & F_{a3-ssd} & \cdots & F_{aN-ssd} \\ F_{a1-sas} & F_{a2-sas} & F_{a3-sas} & \cdots & F_{aN-sas} \\ F_{a1-nlsas} & F_{a2-nlsas} & F_{a3-nlsas} & \cdots & F_{aN-nlsas} \end{bmatrix}$$

In each tier, the storage arrays with greater R values mean that there is more available capacity on those storage arrays. It should be noted that, for an array cluster with a different number of storage tiers, the size of the matrices R and F would differ (e.g., for an array cluster with four tiers, the matrices would be 4×N). More generally, the matrices R and F may be M×N matrices, where M denotes the number of storage tiers in the array cluster.

The values of R and F may be combined to rank the storage arrays in the array cluster according to:

$C=\omega_S*R+\omega_L*F$

C is an M×N matrix, where the value of M is the number of storage tiers in the array cluster. Continuing with the example array cluster that includes three storage tiers (e.g., the extreme performance tier, the performance tier and the capacity tier), C is a 3×N matrix similar to R and F. N is the number of storage arrays in the array cluster. In each tier m, a storage array n with a high value of $C_{m,n}$ is a good candidate (e.g., for increased IO load in the tier m).

In step or phase (4), a data movement solution is determined which meets end-user goals (e.g., reaching long-term storage efficiency). As noted above, "long-term" may be defined by a storage administrator or other end-user of an array cluster. For example, a storage administrator may seek to reach storage efficiency for a next day, week, month, quarter, year, or some other period of time. Consider, for example, data j that is in storage array i tier 1 (e.g., the extreme performance tier), and the predicted access frequency or hot degree $H_{ai,j}$ is also in the high level corresponding to tier 1, then the data j may be kept in place.

Consider, as another example, data j that is in storage array i tier 2 or tier 3 (e.g., the performance tier or the capacity tier), but its predicted access frequency or hot degree $H_{ai,j}$ is in the high level corresponding to tier 1. In this example, the data j should be moved. If intra-storage array data movement functionality (e.g., FAST) of the storage array i where the data j currently resides cannot be leveraged to move the data j to tier 1 type storage of the storage array i (e.g., such as where the storage array i does not have any tier 1 type storage, where the storage array i has tier 1 type storage but insufficient tier 1 type storage is available, etc.), then the data j should be moved to tier 1 storage on another storage array n (e.g., the storage array n with a highest or maximum $C_{1,n}$ value) and then C may be re-calculated. This assumes that the data j is considered eligible for inter-array data movement (e.g., it is in the first class).

Consider, as a further example, data j that is in storage array i tier 1 (e.g., the extreme performance tier), but its predicted access frequency or hot degree $H_{ai,j}$ is in a level corresponding to tier 2 or tier 3. In this example, the data j should be moved. If intra-storage array data movement functionality (e.g., FAST) of the storage array i where the data j currently resides cannot be leveraged to move the data j to tier 2 or tier 3 type storage of the storage array i (e.g., such as where the storage array i does not have any tier 2 or tier 3 type storage, where the storage array i has tier 2 or tier 3 type storage but insufficient tier 2 or tier 3 type storage is available, etc.), then the data j should be moved to tier 2 or tier 3 storage on another storage array n (e.g., the storage array n with a highest or maximum $C_{2,n}$ or $C_{3,n}$ value) and then C may be re-calculated. Again, this assumes that the data j is considered eligible for inter-array data movement (e.g., it is in the first class).

The above processing may be used to determine a plan, guideline or recommendation for moving high activity data to high performance storage (e.g., on the same or a different storage array in an array cluster), and for moving low activity data to low performance storage (e.g., on the same or a different storage array in an array cluster). Such recommendations may be used to automate movement of storage objects or data while taking into account long-term data trends, thereby optimizing array cluster performance and better utilizing storage media across the array cluster.

Figure 8:
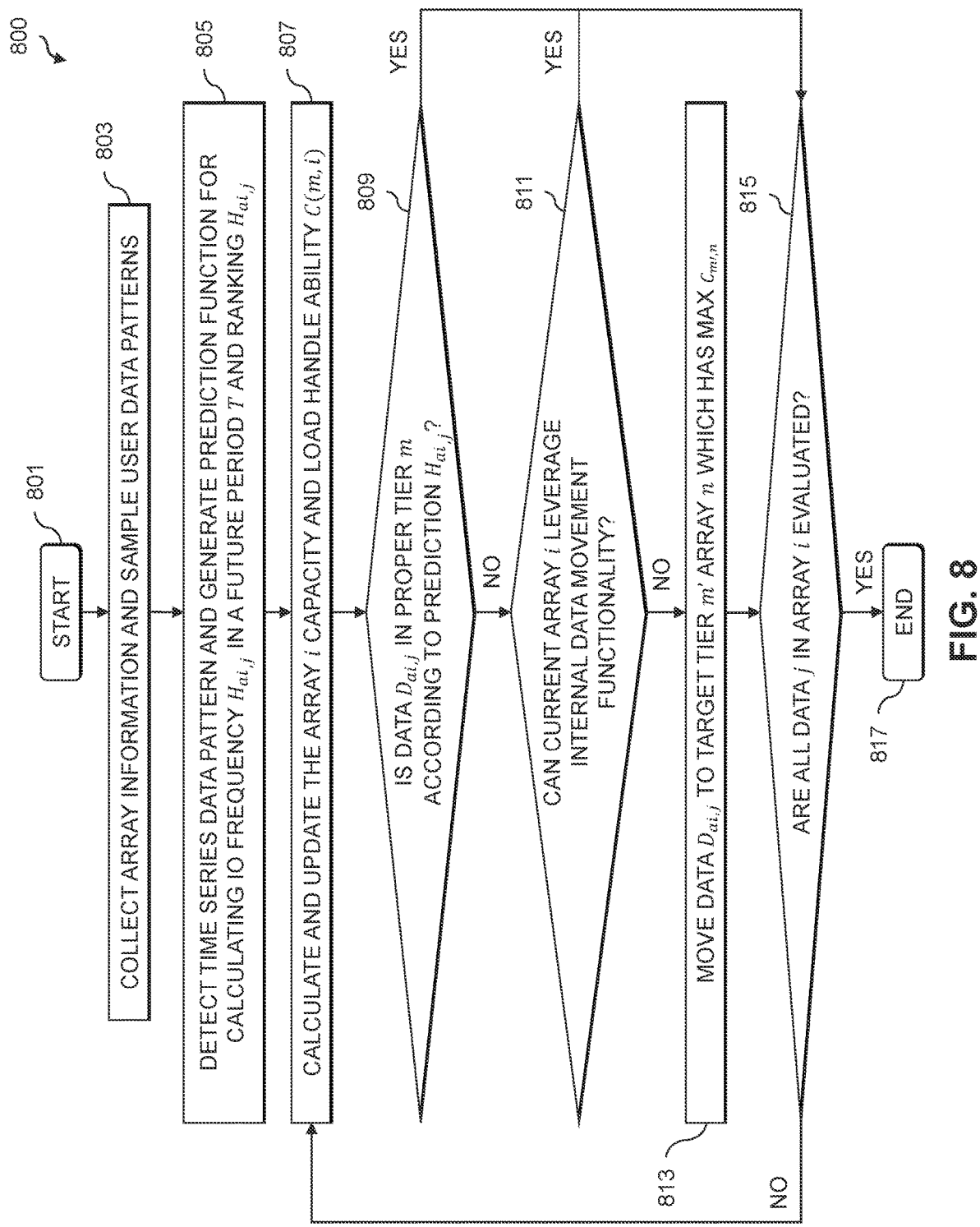
FIG. 8 shows a process flow for optimizing storage cluster performance through data movement across storage devices within and across storage arrays in the storage cluster in an illustrative embodiment.

FIG. 8 shows a process flow 800 for implementing the algorithm for enhancing the efficiency of data movement in an array cluster. The process starts in step 801, and array information is collected and user data patterns are sampled in step 803. In step 805, time series data patterns are detected to generate data access prediction functions for calculating IO frequency $H_{ai,j}$ in a future period T and ranking $H_{ai,j}$ in the array cluster. Storage array i capacity and load handling ability C(m,i) are calculated and updated in step 807.

In step 809, a determination is made as to whether data $D_{ai,j}$ is in a proper tier m according to its prediction $H_{ai,j}$. If the result of the step 809 determination is no, the process flow 800 proceeds to step 811 where a determination is made as to whether the current storage array i for the data $D_{ai,j}$ is able to leverage its internal data movement functionality (e.g., FAST) in order to move the data $D_{ai,j}$ to its proper tier according to its prediction $H_{ai,j}$. If the result of the step 811 determination is no, the process flow 800 proceeds to step 813 where the data $D_{ai,j}$ is moved to a target tier m' on another storage array n which has a highest or maximum $C_{m',n}$ value. The inter-array data movement, as noted above, may be contingent on the data $D_{ai,j}$ being classified in the first class.

If the result of the step 809 determination is yes, then there is no need to move the data $D_{ai,j}$, and the process flow 800 proceeds to step 815. If the result of the step 811 determination is yes, then the internal data movement functionality of the current storage array i is leveraged to move the data $D_{ai,j}$ to its proper tier m according to its prediction $H_{ai,j}$, and the process flow 800 proceeds to step 815. In step, 815, which may be performed following step 813 (or following steps 809 or 811 if either of the determinations 809 or 811 is yes), a determination is made as to whether all data j in the array i have been evaluated. If the result of the step 815 determination is no, the process flow 800 loops back to step 807. If the result of the step 815 determination is yes, then the process flow 800 ends in step 817.

Figure 9A:
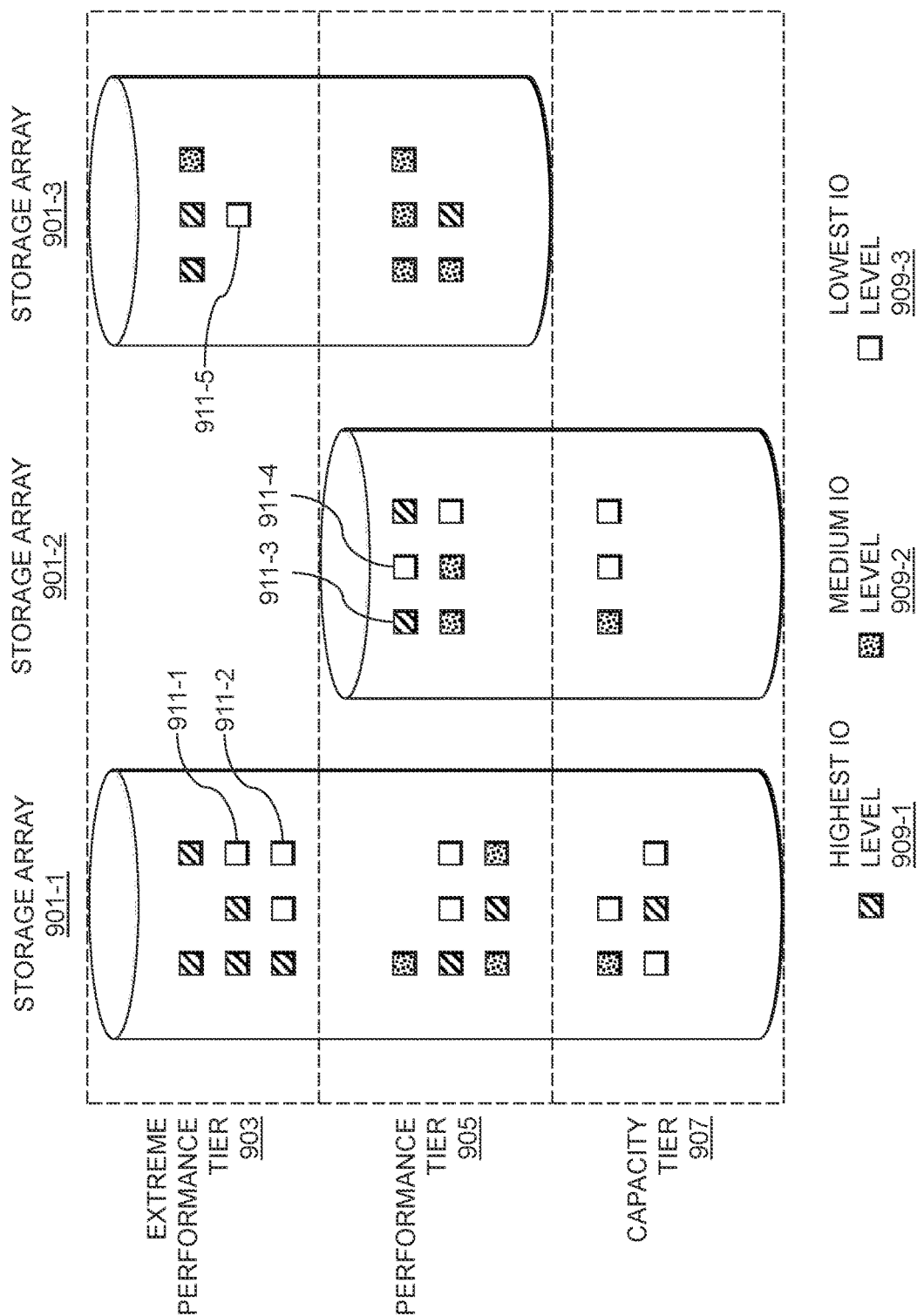
FIGS. 9A and 9B illustrate movement of data among storage arrays and storage tiers in a multi-tier clustered storage system in an illustrative embodiment.
Figure 9B:
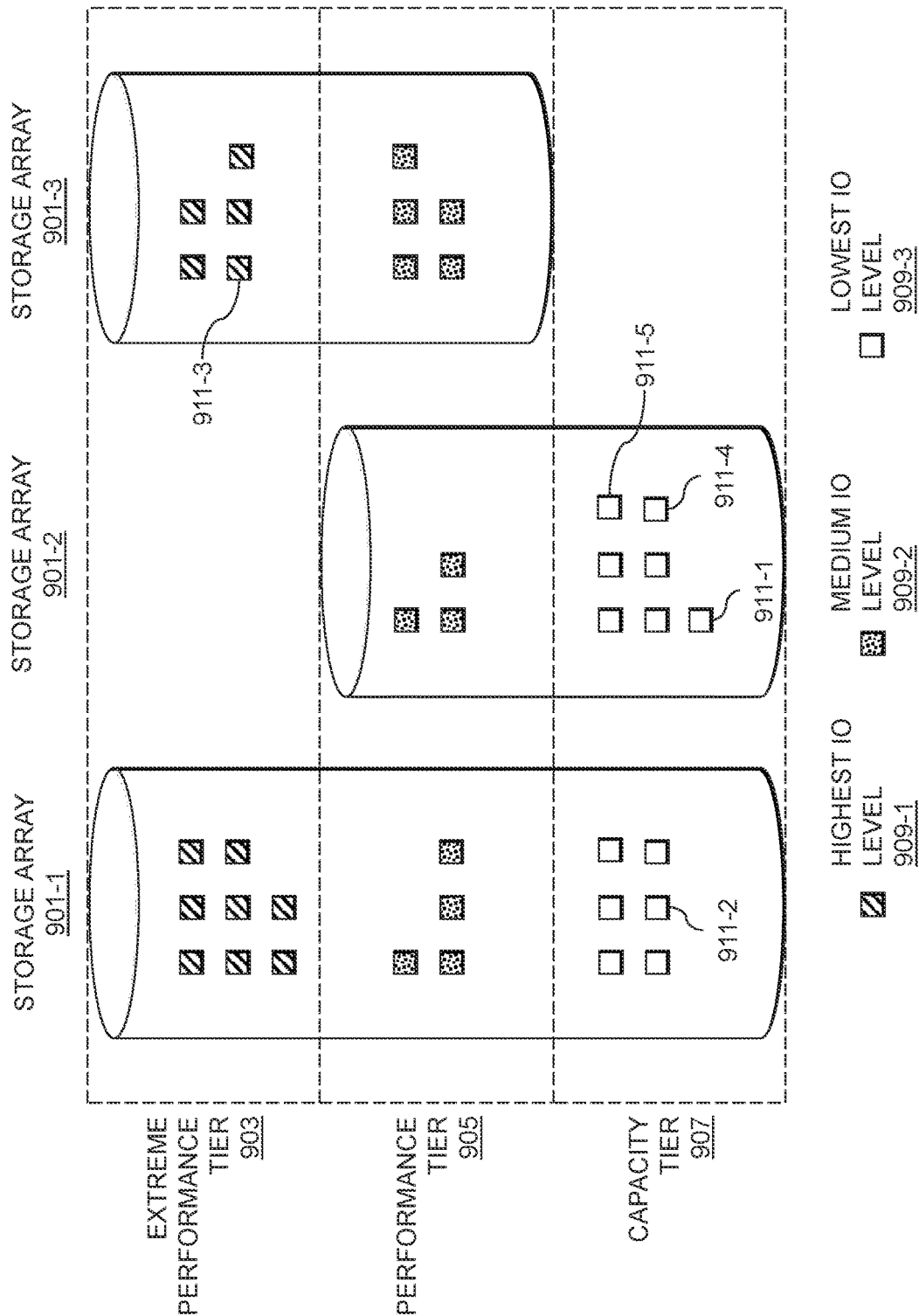

FIGS. 9A and 9B illustrate a set of storage arrays 901-1, 901-2 and 901-3 (collectively, storage arrays 901) in an array cluster that includes three storage tiers, an extreme performance tier 903, a performance tier 905, and a capacity tier 907. In this example, the storage array 901-1 includes storage in each of the three tiers (e.g., the extreme performance tier 903, the performance tier 905 and the capacity tier 907), the storage array 901-2 includes storage in the performance tier 905 and the capacity tier 907, and the storage array 901-3 includes storage in the extreme performance tier 903 and the performance tier 905.

FIG. 9A shows data items (e.g., storage objects) in the storage arrays 901 in the array cluster prior to data movement using the process flow 800 of FIG. 8, where data items are associated with one of three IO levels 909-1, 909-2 and 909-3. The highest IO level 909-1 corresponds to data items whose proper tier is the extreme performance tier 903, the medium IO level 909-2 corresponds to data items whose proper tier is the performance tier 905, and the lowest IO level 909-3 corresponds to data items whose proper tier is the capacity tier 907. FIG. 9B shows data items in the storage arrays 901 in the array cluster following data movement using the process flow 800 of FIG. 8.

For illustration, movement of data items denoted 911-1 through 911-5 will now be described. It is assumed that each of the data items 911-1 through 911-5 are eligible for both intra-array and inter-array data movement. The data items 911-1 and 911-2 have the lowest IO level 909-3, but as shown in FIG. 9A are currently located in storage in the extreme performance tier 903 on storage array 901-1. Thus, the data items 911-1 and 911-2 should be moved. Assume, in this example, that there is insufficient available storage in the capacity tier 907 of the storage array 901-1 for the data item 911-1 but there is sufficient available storage in the capacity tier 907 of the storage array 901-2. Thus, intra-array data movement functionality of the storage array 901-1 cannot be leveraged to move the data item 911-1 to the capacity tier 907, though it can be leveraged for data item 911-2. Thus, as shown in FIG. 9B, the data item 911-1 is moved to the capacity tier 907 storage on storage array 901-2, while the data item 911-2 is moved to the capacity tier 907 storage on storage array 901-1.

The data items 911-3 and 911-4 have the highest IO level 909-1 and the lowest IO level 909-3, respectively, but are both currently located in performance tier 905 storage on the storage array 901-2 as shown in FIG. 9A. Since the storage array 901-2 has no extreme performance tier 903 storage, the data item 911-3 must be moved to another storage array (e.g., either storage array 901-1 or 901-3). As shown in FIG. 9B, the data item 911-3 is illustratively moved to extreme performance tier 903 storage on the storage array 901-3. It is assumed that the storage array 901-2 has sufficient capacity tier 907 storage for the data item 911-4, and thus the data item 911-4 is moved to the capacity tier 907 storage on the storage array 901-2 as shown in FIG. 9B.

The data item 911-5 has the lowest IO level 909-3, but is currently located in the extreme performance tier 903 storage on the storage array 901-3 as shown in FIG. 9A. Since the storage array 901-3 has no capacity tier 907 storage, the data item 911-5 must be moved to another storage array (e.g., either storage array 901-1 or 901-2). As shown in FIG. 9C, the data item 911-5 is illustratively moved to capacity tier 907 storage on the storage array 901-2.

Although only five specific data movement examples are given above for data items 911-1 through 911-5 in FIGS. 9A and 9B, it should be noted that various other data items are moved between the storage tiers 903, 905 and 907, both within and across the storage arrays 901 in the example of FIGS. 9A and 9B.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data movement between storage tiers of a clustered storage system based on predicted data access frequency trend patterns will now be described in greater detail with reference to FIGS. 10 and 11. Although described in the context of system 100, these platforms may also be used to implement at least portions of other information processing systems in other embodiments.

Figure 10:
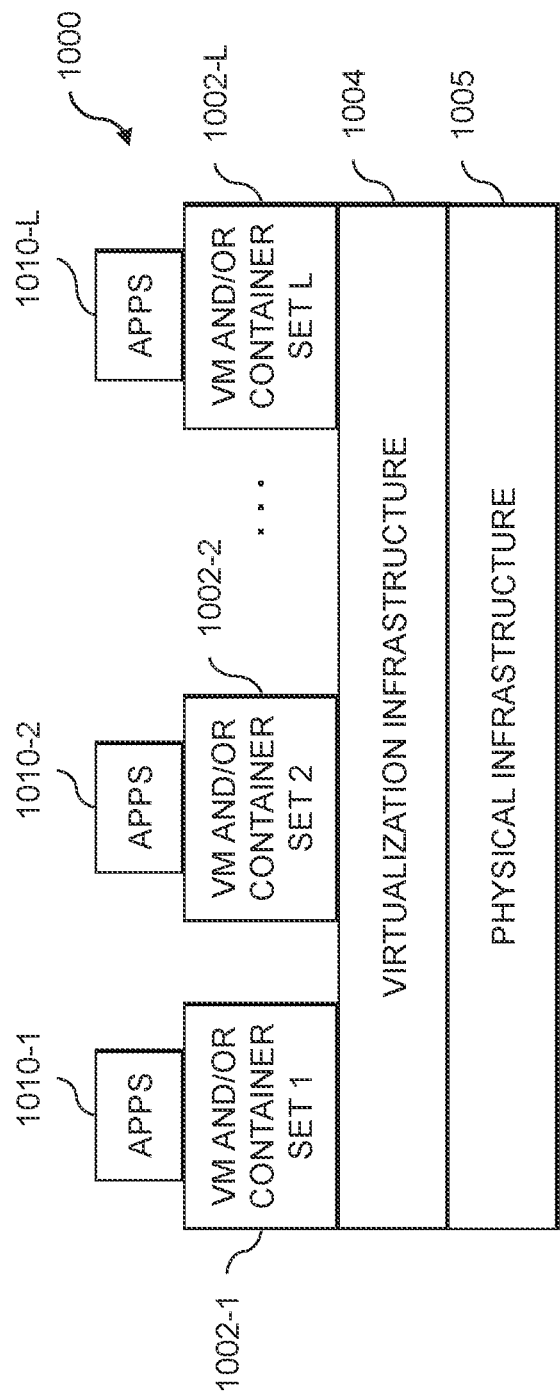
FIGS. 10 and 11 show examples of processing platforms that may be utilized to implement at least a portion of an information processing system in illustrative embodiments.
Figure 11:
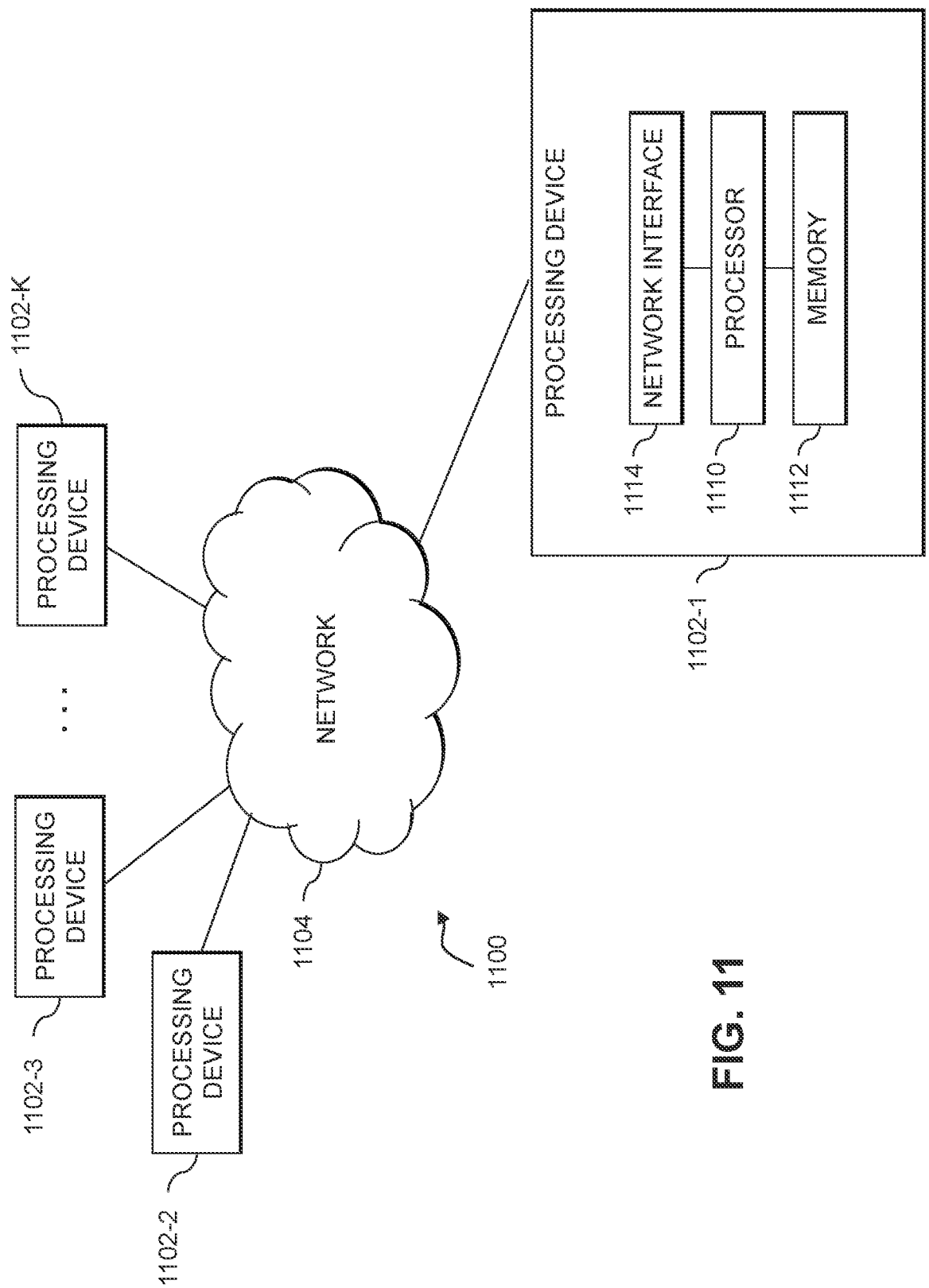

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data movement between storage tiers of a clustered storage system based on predicted data access frequency trend patterns as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage clusters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
generating a predicted data access frequency trend pattern of a given storage object for a designated period of time, the given storage object being stored utilizing a first type of storage resources in a given one of two or more storage systems in a clustered storage system, the first type of storage resources being associated with a first one of two or more storage tiers in the clustered storage system;
classifying the given storage object as a given one of two or more storage object classes based at least in part on the predicted data access frequency trend pattern of the given storage object for the designated period of time, wherein the two or more storage object classes are permitted to utilize different subsets of a set of two or more different types of data movement;
determining, based at least in part on the predicted data access frequency trend pattern of the given storage object for the designated period of time, a given one of the two or more storage tiers in the clustered storage system to utilize for storage of the given storage object during the designated period of time;
responsive to the given storage tier being different than the first storage tier, selecting one of the two or more different types of data movement to utilize for moving the given storage object to a second type of storage resources of one or more of the storage systems in the clustered storage system, the second type of storage resources being associated with the given storage tier in the clustered storage system, the selected type of data movement being selected from a given subset of the set of two or more different types of data movement which are permitted for the given storage object class associated with the given storage object, the two or more different types of data movement comprising a first type of data movement incurring a first resource cost associated with moving data at a first level of granularity and at least a second type of data movement incurring a second resource cost associated with moving data at a second level of granularity, the second level of granularity being greater than the first level of granularity and the second resource cost being greater than the first resource cost, the first type of data movement comprising intra-storage system data movement between two storage devices within a single one of the two or more storage systems in the clustered storage system, the second type of data movement comprising inter-storage system data movement between a first storage device of a first one of the two or more storage systems in the clustered storage system and a second storage device of a second one of the two or more storage systems in the clustered storage system; and
utilizing the selected type of data movement to move the given storage object to the second type of storage resources of said one or more of the storage systems in the clustered storage system;
wherein the two or more storage object classes comprise:
at least a first storage object class permitted to utilize both the first type of data movement incurring the first resource cost and the second type of data movement incurring the second resource cost; and
at least a second storage object class permitted to utilize the first type of data movement incurring the first resource cost but not the second type of data movement incurring the second resource cost.

2. The apparatus of claim 1 wherein said one or more of the storage systems comprises the given storage system.

3. The apparatus of claim 1 wherein said one or more of the storage systems comprises at least one of the two or more storage systems different than the given storage system.

4. The apparatus of claim 1 wherein:
the first storage object class comprises storage objects with predicted data access frequency trend patterns for the designated period of time that are above a first data access frequency threshold or below a second data access frequency threshold; and the second storage object class comprises storage objects with predicted data access frequency trend patterns for the designated period of time that are between the first data access frequency threshold and the second data access frequency threshold.

5. The apparatus of claim 1 wherein utilizing the selected type of data movement to move the given storage object to the second type of storage resources of said one or more of the storage systems in the clustered storage system comprises determining a ranking of the two or more storage systems in the clustered storage system for the given storage tier based at least in part on available storage capacity and load handling ability of each of the two or more storage systems for the given storage tier.

6. The apparatus of claim 5 wherein said one or more of the storage systems in the clustered storage system is selected based at least in part on the determined ranking of the two or more storage systems.

7. The apparatus of claim 1 wherein generating the predicted data access frequency trend pattern of the given storage object for the designated period of time comprises generating a prediction function for predicting a total amount of data accesses for the given storage object in the designated period of time.

8. The apparatus of claim 7 wherein the predicted data access frequency trend pattern comprises one of an increasing data access trend pattern and a decreasing data access trend pattern, and wherein the prediction function is generated utilizing a least squares algorithm.

9. The apparatus of claim 7 wherein the predicted data access frequency trend pattern comprises a cyclic data access trend pattern, and wherein the prediction function is generated utilizing at least one of an autocorrelation algorithm and a discrete Fourier transform algorithm.

10. The apparatus of claim 7 wherein the predicted data access frequency trend pattern comprises an irregular data access pattern, and wherein the prediction function is generated utilizing an average of historical data accesses for the given storage object over a previous period of time.

11. The apparatus of claim 1 wherein utilizing the selected type of data movement to move the given storage object to the second type of storage resources of said one or more of the storage systems in the clustered storage system comprises:
 determining whether the given storage system has an available amount of the second type of storage resources sufficient to store the given storage object; and
 responsive to determining that the given storage system has the available amount of the second type of storage resources sufficient to store the given storage object, moving the given storage object to the second type of storage resources in the given storage system.

12. The apparatus of claim 1 wherein utilizing the selected type of data movement to move the given storage object to the second type of storage resources of said one or more of the storage systems in the clustered storage system comprises:
 determining whether the given storage system has an available amount of the second type of storage resources sufficient to store the given storage object;
 responsive to determining that the given storage system does not have the available amount of the second type of storage resources sufficient to store the given storage object, determining whether the given storage object class associated with the given storage object permits data movement between different ones of the two or more storage systems in the clustered storage system;
 responsive to determining that the given storage object class associated with the given storage object permits data movement between different ones of the two or more storage systems in the clustered storage system, identifying one or more other ones of the two or more storage systems having an available amount of the second type of storage resources sufficient to store the given storage object; and
 moving the given storage object to the second type of storage resources in one of the identified storage systems.

13. The apparatus of claim 1 wherein the first level of granularity comprises movement of data at a file or block level and the second level of granularity comprises movement of data at a logical unit or filesystem level.

14. A computer program product comprising a non-transitory processor-readable storage medium having stored therein program code of one or more software programs, wherein the program code when executed by at least one processing device causes the at least one processing device to perform steps of:
 generating a predicted data access frequency trend pattern of a given storage object for a designated period of time, the given storage object being stored utilizing a first type of storage resources in a given one of two or more storage systems in a clustered storage system, the first type of storage resources being associated with a first one of two or more storage tiers in the clustered storage system;
 classifying the given storage object as a given one of two or more storage object classes based at least in part on the predicted data access frequency trend pattern of the given storage object for the designated period of time, wherein the two or more storage object classes are permitted to utilize different subsets of a set of two or more different types of data movement;
 determining, based at least in part on the predicted data access frequency trend pattern of the given storage object for the designated period of time, a given one of the two or more storage tiers in the clustered storage system to utilize for storage of the given storage object during the designated period of time;
 responsive to the given storage tier being different than the first storage tier, selecting one of the two or more different types of data movement to utilize for moving the given storage object to a second type of storage resources of one or more of the storage systems in the clustered storage system, the second type of storage resources being associated with the given storage tier in the clustered storage system, the selected type of data movement being selected from a given subset of the set of two or more different types of data movement which are permitted for the given storage object class associated with the given storage object, the two or more different types of data movement comprising a first type of data movement incurring a first resource cost associated with moving data at a first level of granularity and at least a second type of data movement incurring a second resource cost associated with moving data at a second level of granularity, the second level of granularity being greater than the first level of granularity and the second resource cost being greater than the first resource cost, the first type of data movement comprising intra-storage system data movement between two storage devices within a single one of the two or more storage systems in the clustered storage system, the second type of data movement comprising inter-storage system data movement between a first storage device of a first one of the two or more storage systems in the clustered storage system and a second storage device of a second one of the two or more storage systems in the clustered storage system; and utilizing the selected type of data movement to move the given storage object to the second type of storage resources of said one or more of the storage systems in the clustered storage system;

wherein the two or more storage object classes comprise:
at least a first storage object class permitted to utilize both the first type of data movement incurring the first resource cost and the second type of data movement incurring the second resource cost; and
at least a second storage object class permitted to utilize the first type of data movement incurring the first resource cost but not the second type of data movement incurring the second resource cost.

15. The computer program product of claim 14 wherein:
the first storage object class comprises storage objects with predicted data access frequency trend patterns for the designated period of time that are above a first data access frequency threshold or below a second data access frequency threshold; and
the second storage object class comprises storage objects with predicted data access frequency trend patterns for the designated period of time that are between the first data access frequency threshold and the second data access frequency threshold.

16. The computer program product of claim 14 wherein the first level of granularity comprises movement of data at a file or block level and the second level of granularity comprises movement of data at a logical unit or filesystem level.

17. A method comprising:
generating a predicted data access frequency trend pattern of a given storage object for a designated period of time, the given storage object being stored utilizing a first type of storage resources in a given one of two or more storage systems in a clustered storage system, the first type of storage resources being associated with a first one of two or more storage tiers in the clustered storage system;
classifying the given storage object as a given one of two or more storage object classes based at least in part on the predicted data access frequency trend pattern of the given storage object for the designated period of time, wherein the two or more storage object classes are permitted to utilize different subsets of a set of two or more different types of data movement;
determining, based at least in part on the predicted data access frequency trend pattern of the given storage object for the designated period of time, a given one of the two or more storage tiers in the clustered storage system to utilize for storage of the given storage object during the designated period of time;
responsive to the given storage tier being different than the first storage tier, selecting one of the two or more different types of data movement to utilize for moving the given storage object to a second type of storage resources of one or more of the storage systems in the clustered storage system, the second type of storage resources being associated with the given storage tier in the clustered storage system, the selected type of data movement being selected from a given subset of the set of two or more different types of data movement which are permitted for the given storage object class associated with the given storage object, the two or more different types of data movement comprising a first type of data movement incurring a first resource cost associated with moving data at a first level of granularity and at least a second type of data movement incurring a second resource cost associated with moving data at a second level of granularity, the second level of granularity being greater than the first level of granularity and the second resource cost being greater than the first resource cost, the first type of data movement comprising intra-storage system data movement between two storage devices within a single one of the two or more storage systems in the clustered storage system, the second type of data movement comprising inter-storage system data movement between a first storage device of a first one of the two or more storage systems in the clustered storage system and a second storage device of a second one of the two or more storage systems in the clustered storage system; and utilizing the selected type of data movement to move the given storage object to the second type of storage resources of said one or more of the storage systems in the clustered storage system;

wherein the two or more storage object classes comprise:
at least a first storage object class permitted to utilize both the first type of data movement incurring the first resource cost and the second type of data movement incurring the second resource cost; and
at least a second storage object class permitted to utilize the first type of data movement incurring the first resource cost but not the second type of data movement incurring the second resource cost; and wherein the method is performed by at least one processing device comprising a processor coupled to a memory.

18. The method of claim 17 wherein:
the first storage object class comprises storage objects with predicted data access frequency trend patterns for the designated period of time that are above a first data access frequency threshold or below a second data access frequency threshold; and
the second storage object class comprises storage objects with predicted data access frequency trend patterns for the designated period of time that are between the first data access frequency threshold and the second data access frequency threshold.

19. The method of claim 17 wherein utilizing the selected type of data movement to move the given storage object to the second type of storage resources of said one or more of the storage systems in the clustered storage system comprises determining a ranking of the two or more storage systems in the clustered storage system for the given storage tier based at least in part on available storage capacity and load handling ability of each of the two or more storage systems for the given storage tier.

20. The method of claim 17 wherein the first level of granularity comprises movement of data at a file or block level and the second level of granularity comprises movement of data at a logical unit or filesystem level.

* * * * *